United States Patent [19]
Hirokane et al.

[11] Patent Number: 5,428,585
[45] Date of Patent: Jun. 27, 1995

[54] MAGNETO-OPTICAL RECORDING MEDIUM COMPRISING FIRST, SECOND AND THIRD MAGNETIC LAYERS AND METHOD OF RECORDING ON SAME

[75] Inventors: Junji Hirokane; Hiroyuki Katayama, both of Nara; Junichiro Nakayama, Shiki; Akira Takahashi, Nara; Kenji Ohta, Kitakatsuragi, all of Japan

[73] Assignee: Sharp Kabushiki Kaisha, Japan

[21] Appl. No.: 102,349

[22] Filed: Aug. 5, 1993

[30] Foreign Application Priority Data

Oct. 6, 1992 [JP] Japan ................................. 4-267346

[51] Int. Cl.$^6$ ............................................. G11B 11/00
[52] U.S. Cl. ......................................... 369/13; 360/59; 360/114; 428/694 ML
[58] Field of Search ............... 369/13, 14, 275.2, 275.3, 369/110, 112, 283–284, 286, 288; 360/59, 114, 131; 365/122; 428/694 ML, 694 SC

[56] References Cited
U.S. PATENT DOCUMENTS 5,278,810  1/1994  Takahashi et al. .................... 369/13

OTHER PUBLICATIONS

Japan Applied Magnetic Society, 15(5):838–844 (1991), pp. 838–845.

*Primary Examiner*—Ali Neyzari
*Attorney, Agent, or Firm*—David G. Conlin; Peter F. Corless

[57] ABSTRACT

A magneto-optical recording medium has (1) a first magnetic layer made of a magnetic material which is changed into a vertical magnetization film in response to a temperature rise while is an in-plane magnetization film at a room temperature; (2) a second magnetic layer made of a vertical magnetization film; and (3) a third magnetic layer made of a vertical magnetic film having a higher Curie temperature than that of the second magnetic layer; and (4) a base substrate on which the first, second, and third magnetic layers are luminated in this order. With the arrangement, the optically modulated overwriting can be carried out with respect to the second magnetic layer and it is not necessary to complete the magnetization direction to one direction for each optically modulated overwriting. Moreover, it is possible to reproduce through the first magnetic layer the information which is recorded on a smaller portion than a light beam spot.

11 Claims, 8 Drawing Sheets

F I G. 9
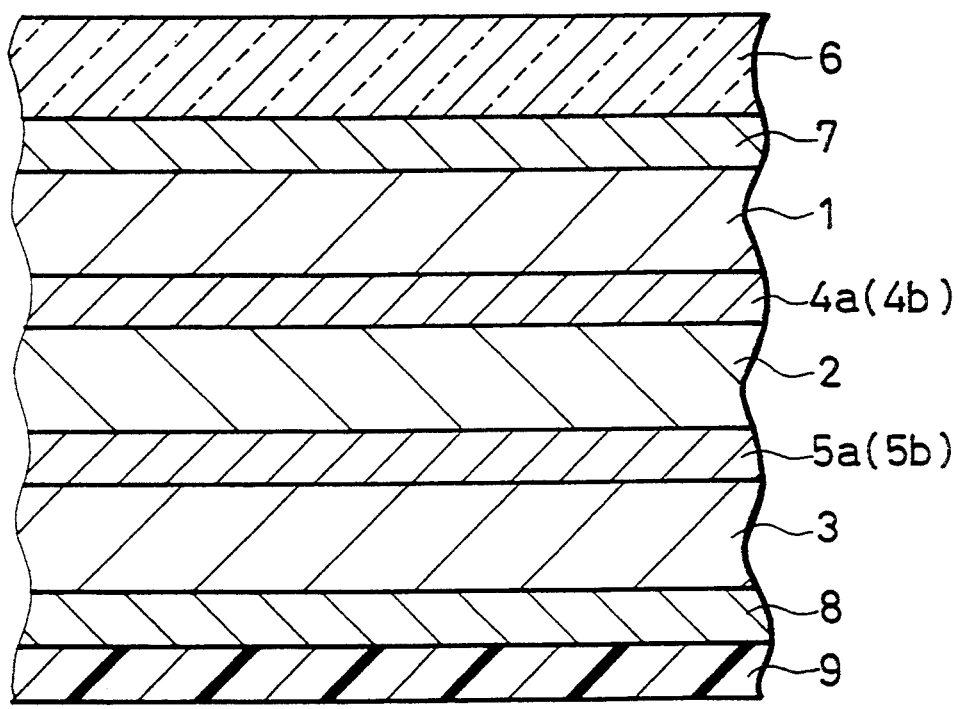

MAGNETO-OPTICAL RECORDING MEDIUM COMPRISING FIRST, SECOND AND THIRD MAGNETIC LAYERS AND METHOD OF RECORDING ON SAME

FIELD OF THE INVENTION

The present invention relates to magneto-optical recording mediums such as a magneto-optical disk, a magneto-optical tape, and a magneto-optical card and relates to a recording and reproducing method using the magneto-optical recording medium.

BACKGROUND OF THE INVENTION

A magneto-optical disk memory has come in practice as a rewritable optical disk memory. Information can be rewritten with respect to the magneto-optical disk memory such that an old information is erased and thereafter a new information is recorded there.

According to a magnetic field modulated overwriting, it is not necessary to erase the old information, thereby enabling to rewrite the information at a high speed. However, the rewriting has the following drawbacks. More specifically, it is difficult to modulate the magnetic field at high frequencys. Further, in order to apply the high frequency magnetic field having a magnitude enough to overwrite, it is required that a magnetic field generating mechanism be in close proximity to the magneto-optical disk memory.

In order to overcome the foregoing drawbacks, the following optically modulated overwriting method is proposed in a Japanese unexamined patent publication No. 62-175948. According to the method, a magneto-optical medium having double layers structure, i.e., a recording layer and an auxiliary recording layer, is employed and the overwriting is carried out based on the modulation of the laser power. With the arrangement, the high frequency magnetic field is no required, so that the overwriting can be carried out at more high speed.

However, the above-mentioned conventional structure has the following problems. More specifically, a magnetization direction of the auxiliary recording layer is preliminarily completed so as to have one direction for each overwriting. So, an initialization magnetic field generating mechanism should be provided in addition to the recording magnetic field generating mechanism, thereby resulting in presenting a large-sized recording and reproducing apparatus and thereby resulting in increasing the cost for the manufacturing.

SUMMARY OF THE INVENTION

It is an object of the present invention to provide a magneto-optical recording medium which can carry out an optically modulated overwriting without an initialization magnetic field generating mechanism and which can reproduce information that is recorded in a smaller portion than a light beam spot.

In order to achieve the foregoing object, the present invention includes the following means:
(a) a first magnetic layer for reading out information, the first magnetic layer being made of a magnetic material which is changed into a vertical magnetization film in response to a temperature rise while is in-plane magnetization film at a room temperature;
(b) a second magnetic layer for recording the information, the second magnetic layer being made of a vertical magnetization film;
(c) a third magnetic layer which acts as an auxiliary recording layer, a magnetization direction of the third magnetic layer being preliminarily completed so as to have one direction, the third magnetic layer being made of a vertical magnetic film having a higher Curie temperature than that of the second magnetic layer; and
(d) base substrate for laminating the first, second, and third magnetic layers thereon.

With the arrangement, a light, beam which intensity is modulated in accordance with recording information so as to have two kinds of power, i.e., a low power and a high power, is projected from the base substrate side with a constant recording magnetic field applied, thereby carring out the optically modulated overwriting with respect to the second magnetic layer. When the optically modulated overwriting is carried out at a temperature around the Curie temperature of the second magnetic layer, the third magnetic layer does not have a temperature of not less than the Curie temperature of the third magnetic layer. This is based on he fact that the third magnetic layer has the higher Curie temperature than that of the second magnetic layer. So, once the magnetization direction of the third magnetic layer is completed so as to have one direction, the magnetization direction does not change during the optically modulated overwriting. According, it is not necessary to provide the initialization magnetic field generating mechanism for completing the magnetization direction so as to have one direction for each optically modulated overwriting.

On the other hand, magneto-optical reproducing can be carried out, with the projection of a light beam which intensity is smaller than that used during the optically modulated overwriting, in such a manner than recorded information of the second magnetic layer is reproduced through a portion of the first magnetic layer which is changed into a vertical magnetization film. The extent of the vertical magnetization film of the first magnetic layer varies depending on the intensity of the projected light beam. This means that the adjusting of the light beam intensity can make the extent smaller than the light beam spot. Accordingly, it is possible to reproduce the information which is recorded on a smaller portion than the light beam spot.

It is preferable that an intermediate layer is provided at least one of (1) between the first and second magnetic layers and (2) between the second and third magnetic layers, the intermediate layer being of an in-plane magnetization film or a non-magnetic film.

With the arrangement, when the intermediate layer of in-plane magnetization film is provided between the first and second magnetic layers, it can be easily carried out to control the strength of an exchange coupling interaction between the first and second magnetic layers, thereby making the film designs of the first and second magnetic layers easy. Similarly, when the intermediate layer of in-plane magnetization film is provided between the second and third magnetic layers, it can be easily carried out to control the strength of an exchange coupling interaction between the second and third magnetic layers, thereby similarly making the film designs of the second and third magnetic layers easy.

In contrast, when the intermediate layer of non-magnetic film is provided between the first and second magnetic layers, no force due to the exchange coupling interaction between the first and second magnetic layers exerts. When the intermediate layer of the non-magnetic film is provided between the second and third magnetic layers, no force due to the exchange coupling interaction between the second and third magnetic layers exerts. However, he recording and reproducing an be carried out in these cases. Further, it is preferable that the intermediate layer of in-plane magnetization film is provided between the first and second magnetic layers and the intermediate layer of non-magnetic film is provided between the second and third magnetic layers. Similarly, it is preferable that the intermediate layer of non-magnetic film is provided between the first and second magnetic layers and the intermediate layer of in-plane magnetization film is provided between the second and third magnetic layers.

For a fuller understanding of the nature and advantages of the invention, reference should be made to the ensuing detailed description taken in conjunction with the accompanying drawings.

BRIEF DESCRIPTION OF THE DRAWINGS

FIG. 9 is a vertical longitudinal sectional view showing the schematic structure of a magneto-optical recording medium of a sixth embodiment of the present invention.

DESCRIPTION OF THE EMBODIMENTS

The following description deals with a first embodiment of the present invention with reference to FIGS. 1 through 3 and FIG. 4.

Figure 1:
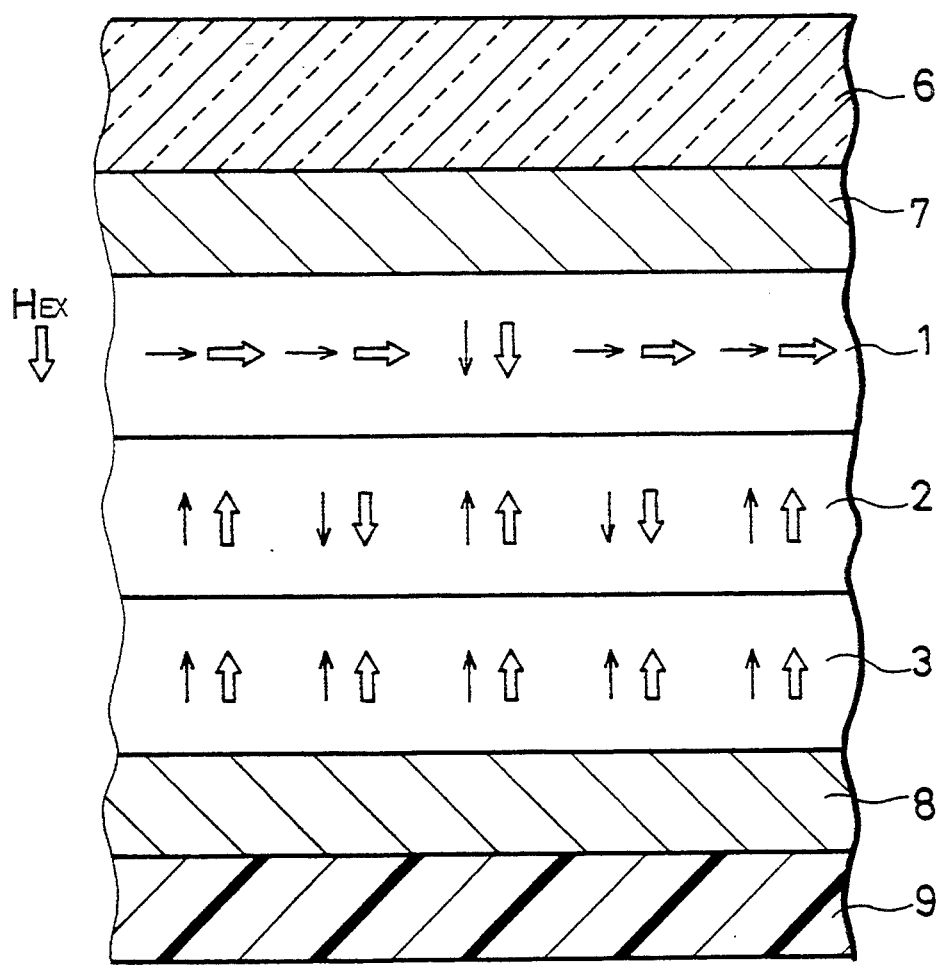
FIG. 1 is a vertical longitudinal sectional view showing the schematic structure of a magneto-optical recording medium of a first embodiment of the present invention.

A magneto-optical recording medium of the present embodiment, as shown in FIG. 1, is arranged such that a first transparent dielectric layer 7, a first magnetic layer 1, a second magnetic layer 2, a third magnetic layer 3, a second transparent dielectric layer 8 and an overcoat layer 9 are laminated in this order on a substrate 6 (base substrate).

Figure 2:
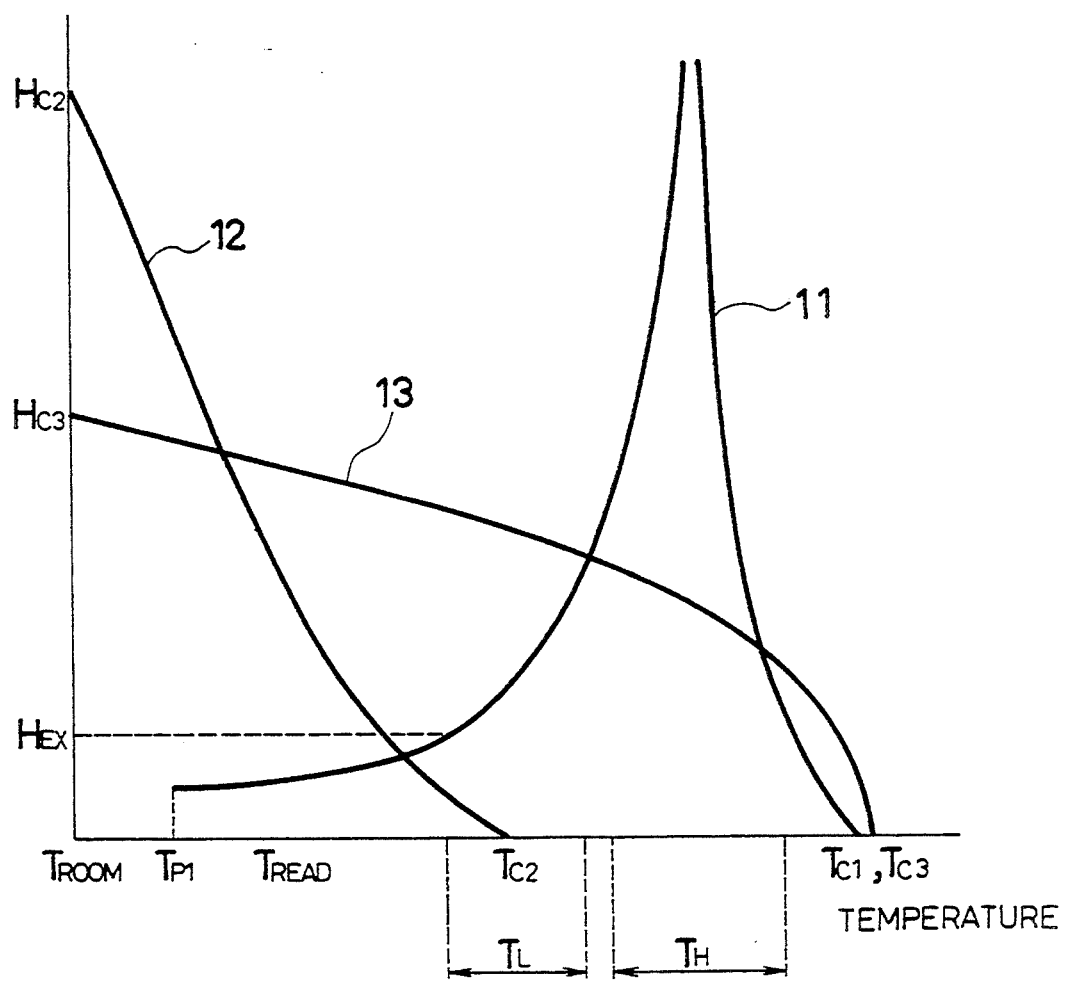
FIG. 2 is a graph showing a temperature dependency of each magnetic layer of the magneto-optical recording medium of FIG. 1.

A temperature dependency of coercive forces of the respective magnetic layers 1 to 3 are shown by curves 11 to 13 of FIG. 2.

The magnetic layer 1 is made of a magnetic material which is an in-plane magnetization film at a room temperature ($T_{ROOM}$) and is changed into a vertical magnetization film at a temperature of not less than $T_{P1}$. The magnetic layer 1 acts as a information reading layer. A Curie temperature ($T_{C1}$) of the magnetic layer 1 should be enough high for the magnetization direction not to change during recording of information. Concretely, $T_{C1}$ of not less than 300° C. is preferable.

A rare earth-transition metal alloy (RE-TM), for instance, is employed as the magnetic layer 1. The RE-TM is a ferrimagnetic material, i.e., a sub-lattice magnetic moment of the rate earth directs reversely with respect to a sub-lattice magnetic moment of the transition metal. The sub-lattice magnetic moments have respective different temperature characteristics. At high temperatures, the sub-lattice magnetic moment of the transition metal is greater than the sub-lattice magnetic moment of the rare earth. Therefore, the RE-TM is arranged such that the content of the RE is greater than that of a composition wherein the compensatory temperature becomes the room temperature. In such case, the magnetic layer 1 is the in-plane magnetization film at temperature $T_{ROOM}$. When a light beam is projected, the temperature of the projected portion rises, so that the sub-lattice magnetic moment of the transition metal becomes relatively great. Accordingly, the sub-lattice magnetic moment of the transition metal is balanced with the sub-lattice magnetic moment of the rate earth, thereby making the total magnetization small. Thus, the magnetic layer 1 is changed into he vertical magnetization in response to the temperature rise.

As mentioned above, it is necessary in the magnetic layer 1 that the content of the rate earth be greater than that of the composition wherein the compensatory temperature becomes the room temperature. Such composition is hereinafter referred to as a RE-rich composition. In contrast, when the content of the transition metal is greater than that of a composition wherein the compensatory temperature becomes the room temperature, such composition is hereinafter referred to as a TM rich composition.

The magnetic layer 2 acts as a information recording layer, the magnetic layer being made of a vertical magnetization film. The coercive forms ($H_{C2}$) at $T_{ROOM}$ requires to be enough strong to stably keep the recorded information at $T_{ROOM}$ in the form of magnetization direction. More concretely, the coercive force $H_{C2}$ of about 100 kA/m is enough for the disturbance such as an external magnetic field. However, the coercive force $H_{C2}$ of not less than 400 kA/m is desirable. Further, a low Curie temperature ($T_{C2}$) is required for recording of information by use of a semiconductor laser. In concrete, he Curie temperature $T_{C2}$ preferably falls in a range between 125° C. and 175° C. Note that it does not matter whether or not a compensatory temperature exists.

The magnetic layer 3 acts as an information assisting recording layer, the magnetic layer being made of a vertical magnetization film. A coercive force ($H_{C3}$) at room temperatures requires to be enough great like the magnetic layer 2 so as not to change the magnetization direction. However, when the coercive force $H_{C3}$ is too great, a greater magnetic field is required for completing magnetization directions of the third magnetic layer 3 so as to have one direction. Due to the fact, in actual, the coercive force $H_{C3}$ preferably falls in a range between 150 kA/m anfd 400 kA/m. An enough high Curie temperature ($T_{C3}$) is required for the magnetization direction not to change during recording of information. In concrete, the Curie temperature of not less than 300° C. is preferable. Note that it does not matter whether or not a compensatory temperature exists.

The following description deals with an optically modulated overwriting with use of the above-mentioned magneto-optical recording medium.

When a light beam is projected onto the magneto-optical recording medium such that the temperature of the magnetic layer 2 rises up to around $T_{C2}$, with applying of a constant recording magnetic field ($H_{EX}$) to the magneto-optical recording medium, the magnetization direction of the magnetic layer 2 is determined according to the following interactions. More specifically, the magnetization direction is determined according to the ballancing of the following interaction strengths: (1) the strength of magnetostatic coupling interaction which causes to complete the magnetization direction of the magnetic layer 2 so as to have the direction of $H_{EX}$; (2) the strength of exchange coupling interaction which causes to complete the sub-lattice magnetic moment of the magnetic layer 2 so as to have the same direction as that of the magnetic layer 1; (3) the strength of magnetostatic coupling interaction which causes to complete the magnetization direction of the magnetic layer 2 so as to have the direction of a stray magnetic field generated from the magnetic layer 1; (4) the strength of exchange coupling interaction which causes to complete the sub-lattice magnetic moment of the magnetic layer 2 so as to have the same direction as that of the magnetic layer 3; and (5) the strength of magnetostatic coupling interaction which causes to complete the magnetization direction of the magnetic layer 2 so as to have the direction of a stray magnetic field generated from the magnetic layer 3.

When the temperature of the magnetic layer 2 rises up to a temperature range ($T_L$ of FIG. 2) around $T_{C2}$ upon projection of a light beam having a low power, the magnetization of the magnetic layer 2 becomes so small or becomes zero. So, the magnetization direction of the magnetic layer 1 directs to the $H_{EX}$ direction. In such case, when each film thickness is set such that a temperature ($T_{11}$) of the magnetic layer 1, which is disposed in an incident side of the light beam, is greater than a temperature ($T_{33}$) of the magnetic layer 3, an interfacial temperature ($T_{12}$) of the magnetic layers 1 and 2 becomes higher than an interfacial temperature ($T_{23}$) of the magnetic layers 2 and 3. Accordingly, the strength of exchange coupling interaction and strength of magnetostatic coupling interaction between the magnetic layers 2 and 3 become relatively stronger. As a result, it is possible to direct the magnetization direction of the magnetic layer 2 to a direction determined by the strength of exchange coupling interaction with the magnetic layer 3.

When the temperature of the magnetic layer 2 rises up to a temperature range ($T_H$ of FIG. 2) higher than $T_{C2}$ in response to the projection of a light beam having a high power, a temperature difference occurs with respect to a film thickness direction like the foregoing case. However, no temperature difference occurs in the temperature lowering process. Namely, when the temperature drops down to a temperature in the vicinity of $T_{C2}$, the following is satisfied: $T_{11} = T_{33}$; and $T_{12} \times T_{23}$. Further, when the temperature drops down to a temperature in the vicinity of $T_{C2}$, the magnetization of the magnetic layer 2 becomes so small or zero. So, the magnetization direction of the magnetic layer 1 coincides with the direction of $H_{EX}$. Thus, the force due to the exchange coupling interaction and force due to the magnetostatic coupling interaction between the magnetic layers 2 and 1 become relatively stronger. As the result, it is possible to make the magnetization direction of the magnetic layer 2 coincide with the direction which is determined by the exchange coupling with the magnetic layer 1.

Accordingly, when (1) the direction of $H_{EX}$ and (2) the magnetization direction of the magnetic layer 3 which is preliminarily completed so as to direct a specific one direction are appropriately set, the magnetization direction of the magnetic layer 2 can be changed based on whether the light beam having a low power or the light beam having a high power is projected, thereby enabling to carry out the optically modulated overwriting.

The following description deals with the way of reading out of information.

When the magnetization direction is read out of the magnetic layer 2, a light beam having a further lower power than the low power of the optically modulated overwriting is projected. The light beam intensity has the Gaussian distribution, so the temperature inside a light beam spot of the magnetic layer 1 has also the Gaussian distribution. Accordingly, it is possible to make only the temperature of the central portion of the light beam spot rise up to a temperature of not less than $T_{P1}$, thereby making the portion be a vertical magnetization state.

The magnetization direction of the magnetic layer 1 is determined by the following interactions. More specifically, the magnetization direction is determined so as to coincide the sub-lattice magnetic moment of the magnetic layer 1 with the sub-lattice magnetic moment of the magnetic layer 2 in accordance with: (1) the exchange coupling between the magnetic layers 1 and 2, and (2) the magnetostatic coupling with causes the magnetization direction of the magnetic layer 1 to coincide with the direction of a stray magnetic field generated from the magnetic layer 2. Accordingly, it is possible to read out from the magnetic layer 2 only the magnetization direction of the central portion of a light beam spot having a smaller diameter than that of the light beam spot.

The following description deals with a manufacturing method of a magneto-optical disk which is one example of the magneto-optical recording medium.

A sputtering apparatus having five targets having respective elements of Al, Gd, Dy, Fe, and Co is prepared. The substrate 6 having a disk shape made of polycarbonate is disposed in the sputtering apparatus so as to be opposite to the target. The disk shaped substrate 6 is provided with (1) pre-grooves having a spiral shape for guiding a light beam and (2) pre-pits as address information. The sputtering apparatus is evacuated up to $1 \times 10^{-6}$ Torr and thereafter a mixed gas of argon and nitrogen is introduced to the sputtering apparatus. An electric power is supplied to the Al target, and the transparent dielectric layer 7 made of AlN is formed on the substrate 6 under the conditions where the gas pressure is $4 \times 10^{-3}$ Torr and the sputtering speed is 12 nm/min.

In order to improve the reproducing characteristic, the thickness of the transparent dielectric layer 7 is set so as to substantially coincide with the ratio of ¼ of a reproducing light wavelength to the refractive index of the transparent dielectric layer 7. When the reproducing light wavelength is 800 nm, the thickness of the transparent dielectric layer 7 falls in a range between 10 nm to 80 nm. Note that 60 nm is employed as the thickness of the transparent dielectric layer 7 according to the present embodiment.

After the transparent dielectric layer 7 is formed, the sputtering apparatus is evacuated again up to $1 \times 10^{-6}$ Torr and thereafter argon gas is introduced to the sputtering apparatus. With supplying of an electric power to the respective Gd, Dy, Fe, and Co targets, the magnetic layer 1 of GdDyFeCo is formed under the conditions where the gas pressure is $4 \times 10^{-3}$ Torr and the sputtering speed is 15 nm/min.

The magnetic layer 1 is required to have RE-rich composition since it should be the in-plane magnetization state at room temperatures and it also should be the vertical magnetization direction at high temperatures.

The magnetic layer 1, as mentioned above, should show the in-plane magnetization state at room temperatures while should show he vertical magnetization state at high temperatures. It does not matter whether or not the compensatory temperature exists. According to the present embodiment, he compensatory temperature is 270° C., $T_{C1}$ is 350° C., and the film thickness is 50 nm.

Next, it is suspended to supply the power to the Gd target while the power is supplied to the respective Dy, Fe, and Co targets, thereby forming the magnetic layer 2 made of DyFeCo. It does not matter whether the magnetic layer 2 has the RE-rich composition or TM-rich composition and does not matter whether or not the compensatory temperature exists. According to the present embodiment, $H_{C2}$ at $T_{ROOM}$ is 800 kA/m, no compensatory temperature exists, $T_{C2}$ is 150° C. and the film thickness is 50 nm.

Next, the power which is supplied to Dy, Fe, and Co is controlled such that the magnetic layer 3 is made of DyFeCo which has a different composition from that of the magnetic layer 2. It does not matter whether the magnetic layer 3 has RE-rich composition or TM-rich composition and does not matter whether the compensatory temperature exists. According to the present embodiment, $H_{C3}$ at $T_{ROOM}$ is 250 kA/m, no compensatory temperature exists, $T_{C3}$ is 350° C. and the film thickness is 50 nm.

Next, a mixed gas of argon and nitrogen is introduced to the sputtering apparatus. The electric power is supplied to the Al target, and the transparent dielectric layer 8 made of AlN is formed under the conditions where the gas pressure is $4 \times 10^{-3}$ Torr and the sputtering speed is 12 nm/min. There is no limitation to the film thickness of the transparent dielectric layer 8 provided that the magnetic layers 1 to 3 can be protected from corrosion such as oxidation. According to the present embodiment, the transparent dielectric layer 8 is 50 nm thick.

After the above procedure, the overcoat layer 9 is formed by spin coating of an ultraviolet hardening resin and by projection of the ultraviolet light. Note that a thermal hardening resin may be employed instead of the ultraviolet hardening resin.

Characteristics of respective four magneto-optical disk samples $A_1$ to $D_1$, which are manufactured as experiment, are shown i Table 1.

Figure 3:
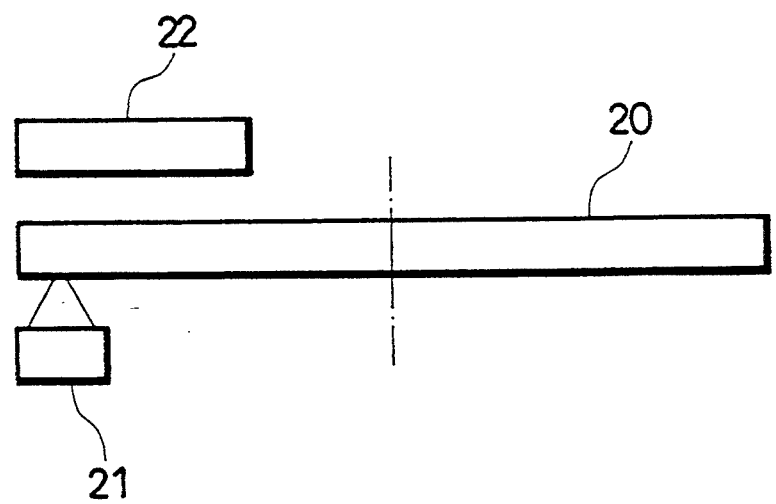
FIG. 3 is a diagram showing a schematic structure of a magneto-optical disk apparatus.
Figure 4:
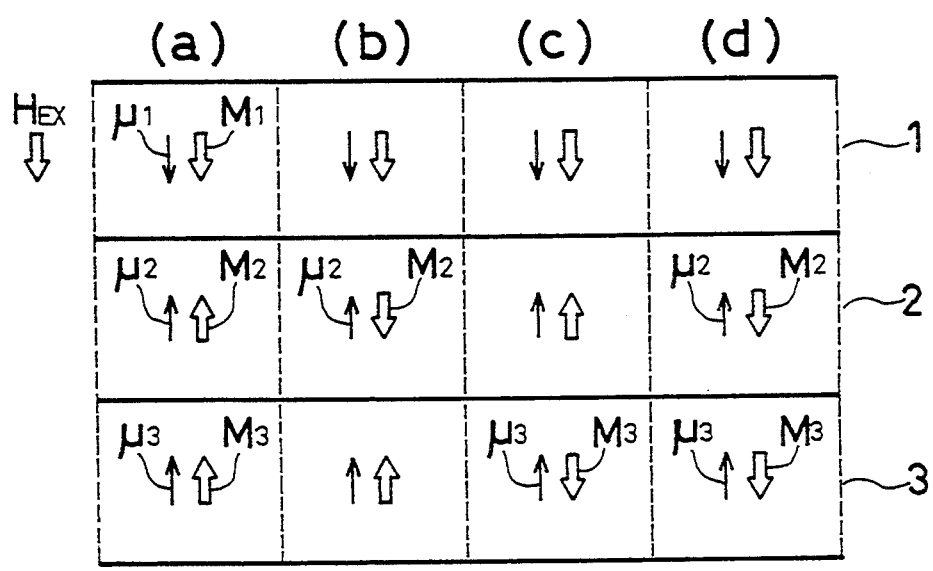
FIG. 4 is explanatory views showing respective magnetizations of the magnetic layers and sub-lattice magnetic moments of rare earth transition metal in the magneto-optical recording medium of FIG. 1.

A test was conducted such that a magneto-optical disk apparatus of FIG. 3 record and reproduces on and from the samples $A_1$ to $D_1$. The magneto-optical disk apparatus is comprised of an optical head 21 having a semiconductor laser (not shown) for projecting a laser beam onto a magneto-optical disk 20 and a constant magnetic field generating mechanism 22 for generating the constant recording magnetic field $H_{EX}$.

After the magneto-optical disk 20 of the sample $A_1$ is placed in the magneto-optical disk apparatus, recording of information was carried out by switching the laser power between a low power (6 mW) and a high power (10 mW) while applying the magnetic field $H_{EX}$ of 25 kA/m from the constant magnetic field generating mechanism 22 to a light beam projected portion. In such case, the magneto-optical disk 20 is rotated such that a light beam projected portion of the magneto-optical disk 20 has a linear velocity of 10 m/s, and the laser power is optically modulated at a frequency of 5 MHz. As a result, reversed magnetic domains having a length of 1 µm could be formed in the magnetic layer 2 at a period of 2 µm. Thereafter, reproducing of information was carried out with a laser power of 2 mW. As a result, a magneto-optical signal having a frequency of 5 MHz could be obtained from the magnetic layer 1.

Next, after optically modulating the laser power at a frequency of 10 MHz, the overwriting was carried out with respect to the reversed magnetic domains which was already formed at the frequency of 5 MHz. As a result, no reversed magnetic domain of 5 MHz was not found while reversed magnetic domains having a length of 0.5 µm could be newly formed in the magnetic layer 2 at a period of 1 µm. Thereafter, reproducing of information was carried out with a laser power of 2 mW. As a result, only a magneto-optical signal having a frequency of 10 MHz could be obtained from the magnetic layer 1. In that case, the amplitude of the magneto-optical signal was substantially the same as that of the magneto-optical signal of 5 MHz. The experiment shows that it is possible to reproduce the recorded information of a smaller portion than the laser beam spot by the use of the magnetic layer 1. More specifically, this means that it is possible to reproduce the information only from a portion of the magnetic layer 2, the portion facing the portion which shows a vertical magnetization state in response to the temperature rise.

In the sample $A_1$, the magnetic layers 1 to 3 have RE-rich compositions respectively. As shown in FIG. 4(a), magnetization directions $M_1$ to $M_3$ of the magnetic layers 1 to 3 coincide with sub-lattice magnetic moments $\mu_1$ to $\mu_3$ respectively. Note that the constant recording magnetic field $H_{EX}$ is applied downward such that the sub-lattice magnetic moment $\mu_1$ of the rare earth of the magnetic layer 1 directs downward. Note that the sub-lattice magnetic moment $\mu_3$ of the rare earth of the magnetic layer 3 is preliminarily arranged so as to direct upward.

The magnetization direction $M_2$ of the magnetic layer 2 is directed upward by the force due to the exchange coupling interaction with the magnetic layer 3. In contrast, the magnetization direction $M_2$ of the magnetic layer 2 is directed downward by the forces due to the following interactions: (1) the exchange coupling interaction with the magnetic layer 1, (2) the magnetostatic coupling interaction with the magnetic layer 1, (3) the magnetostatic coupling interaction with the magnetic layer 3, and (4) the magnetostatic coupling interaction with the magnetic field $H_{EX}$. In the magnetic layer 1, only the temperature rised portion is changed in to the vertical magnetization state. So, the direction of a stray magnetic field generated by the magnetic layer 1 coincides with the magnetization direction $M_1$ of the magnetic layer 1. In the magnetic layer 3, the magnetization $M_3$ of the temperature rised portion is smaller than the surroundings. So, there generates a stray magnetic field having a reverse direction with respect to the magnetization $M_3$ of the temperature rised portion. Accordingly, the stray magnetic field generated by the magnetic layer 1 and the stray magnetic field generated by the magnetic layer 3 have the same direction with each other.

As mentioned above, the upward force and downward force are exerted on the magnetization direction $M_2$ of the magnetic layer 2. However, as mentioned earlier, when the film thickness of the magnetic layer 2 is set such that the magnetic layer 1 rises higher than the magnetic layer 3 in response to the projection of the laser beam having the low power and is set such that the magnetic layer 1 rises up to the same temperature as the magnetic layer 3 in response to the projection of the laser beam having the high power, there occurs a difference between the force from the magnetic layer 1 and the force from the magnetic layer 3, thereby enabling to carry out the optically modulated overwriting.

In the sample $B_1$, the magnetic layer 2 has a TM-rich composition. As shown in FIG. 4(b), a magnetization direction $M_2$ reversely directs with respect to sub-lattice magnetic moments $\mu_2$ of the rare earth.

The magnetization direction $M_2$ of the magnetic layer 2 is directed upward by the force due to the exchange coupling interaction with the magnetic layer 1. In contrast, the magnetization direction $M_2$ of the magnetic layer 2 is directed downward by the forces due to the following interactions: (1) the exchange coupling interaction with the magnetic layer 3, (2) the magnetostatic coupling interaction with the magnetic layer 1, and (3) the magnetostatic coupling interaction with the magnetic field $H_{EX}$.

The optically modulated overwriting and reproduction could be carried out in the sample $B_1$ like the case of the sample $A_1$.

In the sample $C_1$, the magnetic layer 3 has a TM-rich composition. As shown in FIG. 4(c), magnetization direction $M_3$ of the magnetic layer 3 reversely directs with respect to sub-lattice magnetic moments $\mu_3$ of the rare earth.

The magnetization direction $M_2$ of the magnetic layer 2 is directed upward by the forces due to the exchange coupling interaction with the magnetic layer 3 and magnetostatic coupling interaction with the magnetic layer 3. In contrast, the magnetization direction $M_2$ of the magnetic layer 2 is directed downward in response to the forces due to following interactions: (1) the exchange coupling interaction with the magnetic layer 1, (2) the magnetostatic coupling interaction with the magnetic layer 1, and (3) the magnetostatic coupling interaction with the magnetic field $H_{EX}$.

The optically modulated overwriting and reproduction could be carried out with respect to the sample $C_1$ like the case of the sample $A_1$. However, the optimum magnetic field of $H_{EX}$ was greater than that of the sample $A_1$, i.e., 32 kA/m. This is based on the fact that the force due to the magnetostatic coupling interaction with the magnetic layer 3 is exerted on the magnetic layer 2 so as to direct the magnetization direction $M_2$ upward.

In the sample $D_1$, the magnetic layers 2 and 3 have TM-rich compositions respectively. As shown in FIG. 4(d), the magnetization direction $M_2$ of the magnetic layer 2 reversely directs with respect to sub-lattice magnetic moments $\mu_2$ of the RE, and the magnetization direction $M_3$ of the magnetic layer 3 reversely directs with respect to sub-lattice magnetic moments $\mu_3$ of the RE.

The magnetization direction $M_2$ of the magnetic layer 2 is directed upward by the forces due to the exchange coupling interaction with the magnetic layer 1 and magnetostatic coupling interaction with the magnetic layer 3. In contrast, the magnetization direction $M_2$ of the magnetic layer 2 is directed downward by the forces due to following interactions: (1) the exchange coupling interaction with the magnetic layer 3, (2) the magnetostatic coupling interaction with the magnetic layer 1, and (3) the magnetostatic coupling interaction with the magnetic field $H_{EX}$.

The optically modulated overwriting and reproduction could be carried out with respect to the sample $D_1$ like the case of the sample $A_1$. However, the optimum magnetic field of $H_{EX}$ was greater than that of the sample $A_1$, i.e., 32 kA/m. This is based on the fact that the force due to the magnetostatic coupling interaction with the magnetic layer 3 is exerted on the magnetic layer 2 so as to direct the magnetization direction $M_2$ upward.

The samples $A_1$, $B_1$, $C_1$, and $D_1$ deal with the case where each one of the magnetic layers 1 to 3 has a film thickness of 50 nm. However, it is possible to arrange the magnetic layers such that the magnetic layers, 1, 2, and 3 have respective film thicknesses of 50 nm, 100 nm, and 50 nm. With the arrangement, it is possible to effectively make use of the temperature difference generated in a thickness direction.

Figure 5:
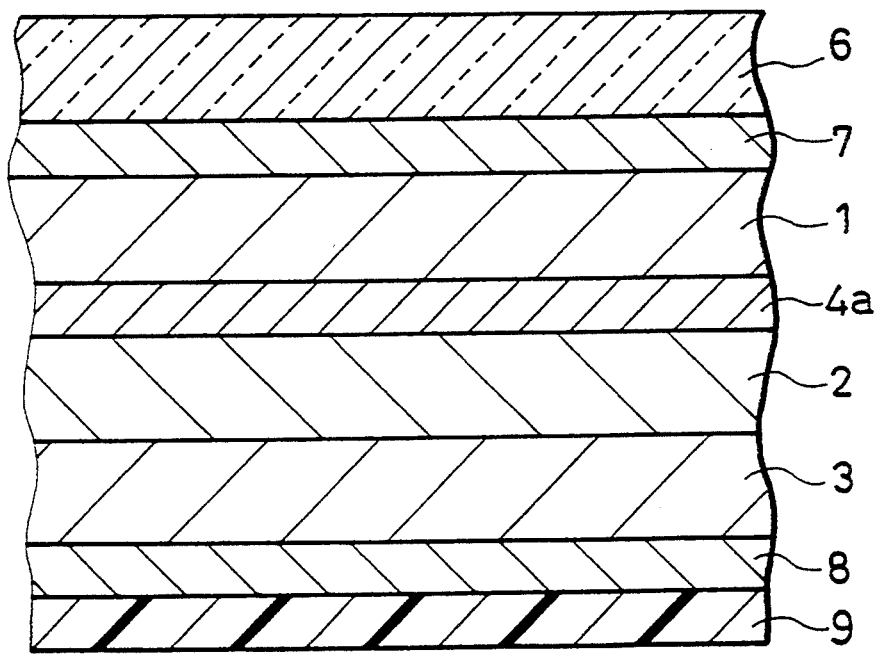
FIG. 5 is a vertical longitudinal sectional view showing the schematic structure of a magneto-optical recording medium of a second embodiment of the present invention.

The following description deals with a second embodiment of the present invention with reference to FIG. 5. Note that, for convenience sake, the same reference numerals are given to members which have the same functions as those of the above-mentioned embodiment and the explanations thereof are omitted here.

A magneto-optical recording medium of the present embodiment, as shown in FIG. 5, is distinguished over the above-mentioned embodiment in that an intermediate layer 4a made of an in-plane magnetization film is provided between the magnetic layers 1 and 2.

The optically modulated overwriting and reproduction is carried out in like manner of the earlier mentioned embodiment. According to the present embodiment, it is possible to control the strength of the exchange coupling interaction between the magnetic layers 1 and 2 since the intermediate layer 4a made of in-plane magnetization film is provided, thereby resulting in that the film thicknesses of the magnetic layers 1and 2 are designed with ease.

Note that no force due to the exchange coupling interaction between the magnetic layers 1 and 2 is exerted at temperatures higher than a Curie temperature of the intermediate layer 4a. Accordingly, it is preferable in order to accurately carry out the optically modulated overwriting that the Curie temperature of the intermediate layer 4a is substantially the same as the Curie temperature $T_{C2}$ of the magnetic layer 2.

Samples $A_2$ to $D_2$ of magneto-optical disks as one example of the above-mentioned magneto-optical recording medium are manufactured as a experiment. In the manufacturing, the same sputtering apparatus is employed so as to form an in-plane magnetization film made of DyFeCo as the intermediate layer $4a$ on the magnetic layer 1. The Curie temperature of the intermediate layer $4a$ is set to 150° C. which is the same temperature as the Curie temperature $T_{C2}$ of the magnetic layer 2.

The respective samples $A_2$ to $D_2$ are distinguished over the earlier mentioned samples $A_1$ to $D_1$ in that they have respective intermediate layers $4a$. After the respective samples $A_2$ to $D$ were placed into the magneto-optical disk apparatus like the foregoing embodiment, recording the reproduction operations were carried out. As a result, good overwriting characteristics and good reproducing characteristics were obtaied.

Note that in the samples $A_2$ to $D_2$ of the present embodiment the force due to the exchange coupling interaction between the magnetic layers 1 and 2 is weaker than that of the earlier mentioned embodiment since each intermediate layer $4a$ controls the force. As a result, the optimum magnetic fields $H_{EX}$ of the samples $A_2$, $B_2$, $C_2$, and $D_2$ were 28 kA/m, 20 kA/m, 36 kA/m, and 28 kA/m respectively unlike the earlier mentioned embodiment.

Figure 6:
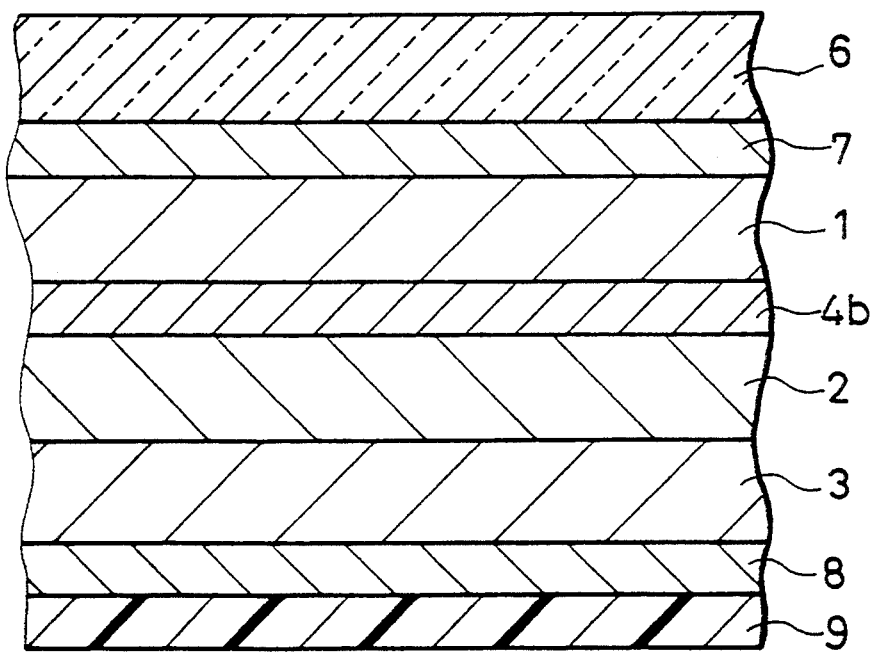
FIG. 6 is a vertical longitudinal sectional view showing a schematic structure of a magneto-optical recording medium of the third embodiment of the present invention.

The following description deals with a third embodiment of the present invention with reference to FIG. 6. Note that, for convenience sake, the same reference numerals are given to members which have the same functions as those of the above-mentioned embodiment and the explanations thereof are omitted here.

A magneto-optical recording medium of the present embodiment, as sown in FIG. 6, is distinguished over the above-mentioned embodiment in that an intermediate layer $4b$ made of a non-magnetic film is provided between the magnetic layers 1 and 2.

No force due to the exchange coupling interaction between the magnetic layers 1 and 2 exerts since the intermediate layer $4b$ of non-magnetic film is provided. Accordingly, the optically modulated overwriting is carried out so as to balance with each other the following forces: (1) the force due to the magnetostatic coupling interaction which causes to direct the magnetization direction of the magnetic layer 2 to the direction of $H_{EX}$; (2) the force due to the magnetostatic coupling interaction which causes to direct the magnetization direction of the magnetic layer 2 to a stray magnetic field which is generated by the magnetic layer 1; (3) the force due to the magnetostatic coupling interaction which causes to direct the sub-lattice magnetic moment of the magnetic layer 2 to that of the magnetic layer 3; and (4) the force due to the magnetostatic coupling interaction which causes to direct the magnetization direction of the magnetic layer 2 to a stray magnetic field which is generated by the magnetic layer 3. In the reproducing operation, only the force due to the magnetostatic coupling interaction with the magnetic layer 2 is exerted on the magnetic layer 1.

The optically modulated overwriting and reproduction are carried out with respect to the magneto-optical recording medium of the present embodiment in like manner of the earlier mentioned embodiment.

Samples $A_3$ to $D_3$ of magneto-optical disks as one example of the above-mentioned magneto-optical recording medium are manufactured as an experiment. In the manufacturings, the same sputtering apparatus is employed so as to form on the magnetic layer 1 a non-magnetic film made of Al as the intermediate layer $4b$.

The respective samples $A_3$ to $D_3$ are distinguished over the earlier mentioned $A_1$ to $D_1$ in that they have respective intermediate layers $4b$. After the respective samples $A_3$ to $D_3$ were placed into the magneto-optical disk apparatus like the foregoing embodiment, recording and reproduction operations were carried out. As a result, good overwriting characteristics and good reproducing characteristics were obtaied except for the case of the sample $B_3$.

Note that no force due to the exchange coupling interaction between the magnetic layers 1 and 2 is exerted. So, the optimum magnetic fields $H_{EX}$ of the samples $A_3$, $C_3$, and $D_3$ were 32 kA/m, 40 kA/m, and 25 kA/m respectively unlike the foregoing embodiment.

Note that in the case of the sample $B_3$ it was not possible to carry out the optically modulated overwriting since only one directional force is exerted on the magnetization $M_2$ of the magnetic layer 2.

The present embodiment employs Al as the material of the intermediate layer $4b$. However, AlN may be alternatively employed. Further, it may be possible that other targets than he five element targets are prepared and non-magnetic layer made of such as Ti, Cr, Ta, Mo, Si, SiO, AlSiO, or SiN is formed on the magnetic layer 1.

Figure 7:
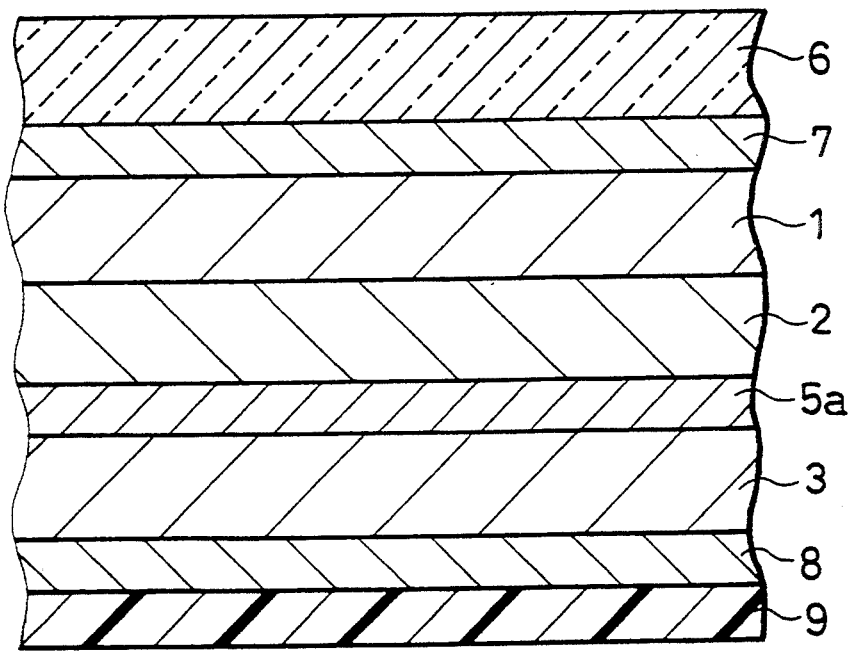
FIG. 7 is a vertical longitudinal sectional view showing a schematic structure of a magneto-optical recording medium of the fourth embodiment of the present invention.

The following description deals with a fourth embodiment of the present invention with reference to FIG. 7. Note that, for convenience sake, the same reference numerals are given to members which have the same functions as those of the above-mentioned embodiment and the explanations thereof are omitted here.

A magneto-optical recording medium of the present embodiment, as shown in FIG. 7, is distinguished over the first embodiment in that an intermediate layer $5a$ made of an in-plane magnetization film is provided between the magnetic layers 2 and 3.

The optically modulated overwriting and reproduction could be carried out like the case of the foregoing embodiment. According to the present embodiment, it is possible to control the force due to the exchange coupling interaction between the magnetic layers 2 and 3, since the intermediate layer $5a$ made of in-plane magnetization film is provided. The arrangement makes the film designs of the magnetic layers 2 and 3 easy.

Note that it is preferable in order to accurately carry out the optically modulated overwriting that a Curie temperature of the intermediate layer $5a$ is substantially the same as the Curie temperature $T_{C2}$ of the magnetic layer 2. This is based on the fact that no force due to the exchange coupling interaction is exerted between the magnetic layers 2 and 3 at higher temperatures than the Curie temperature of the intermediate layer $5a$.

Samples $A_4$ and $D_4$ of magneto-optical disks as one example of the above-mentioned magneto-optical recording medium are manufactured as an experiment. In the manufacturings, the same sputtering apparatus is employed so as to form on the magnetic layer 2 an in-plane magnetization film made of DyFeCo as the intermediate layer $5a$. The Curie temperature of the intermediate layer $5a$ is set to 150° C. which coincides with the temperature $T_{C2}$ of the magnetic layer 2.

Samples $A_4$ to $D_4$ are respectively the same as those of $A_1$ to $D_1$ except that the present samples have the respective intermediate layers $5a$. After the respective samples $A_4$ to $D_4$ were placed into the magneto-optical disk apparatus like the foregoing embodiment, recording and reproduction operations were carried out. As a result, good overwriting characteristics and good reproducing characteristics were obtaied.

Note that in the samples $A_4$ to $D_4$ of the present embodiment the force due to the exchange coupling interaction between the magnetic layers 2 and 3 is weaker than that of the earlier mentioned embodiment since each intermediate layer $5a$ controls the force. As a result, the optimum magnetic fields $H_{EX}$ of the samples $A_4$, $B_4$, $C_4$, and $D_4$ were 20 kA/m, 28 kA/m, 28 kA/m, and 36 kA/m respectively unlike the earlier mentioned embodiment.

Figure 8:
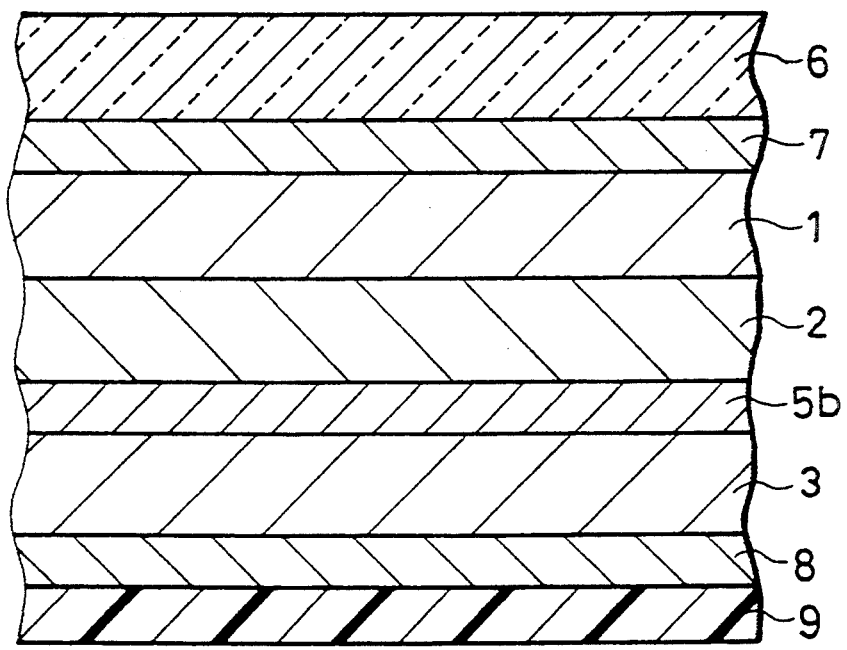
FIG. 8 is a vertical longitudinal sectional view showing the schematic structure of a magneto-optical recording medium of a fifth embodiment of the present invention.

The following description deals with a fifth embodiment of the present invention with reference to FIG. 8. Note that, for convenience sake, the same reference numerals are given to members which have the same functions as those of the above-mentioned embodiment and the explanations thereof are omitted here.

A magneto-optical recording medium of the present embodiment, as shown in FIG. 8, is distinguished over the foregoing embodiment in that an intermediate layer $5b$ made of a non-magnetic film is provided between the magnetic layers 2 and 3.

No force due to the exchange coupling interaction between the magnetic layers 2 and 3 exerts since the intermediate layer $5b$ of non-magnetic film is provided. Accordingly, the optically modulated overwriting is carried out so as to balance with each other the following forces: (1) the force due to the magnetostatic coupling interaction which causes to direct the magnetization direction of the magnetic layer 2 to the direction of $H_{EX}$; (2) the force due to the exchange coupling interaction which causes to direct the sub-lattice magnetic moment of the magnetic layer 1 to that of the magnetic layer 2; (3) the force due to the magnetostatic coupling interaction which causes to direct the magnetization direction of the magnetic layer 2 to a stray magnetic field which is generated by the magnetic layer 1; and (4) the force due to the magnetostatic coupling interaction which causes to direct the magnetization direction of the magnetic layer 2 to a stray magnetic field which is generated by the magnetic layer 3. In the reproducing operation, the force due to the magnetostatic coupling interaction with the magnetic layer 2 and the force due to exchange coupling interaction with the magnetic layer 2 are exerted on the magnetic layer 1.

The optically modulated overwriting and reproduction are carried out with respect to the magneto-optical recording medium of the present embodiment in like manner of the earlier mentioned embodiment.

Samples $A_5$ to $D_5$ of magneto-optical disks as one example of the above-mentioned magneto-optical recording medium are manufactured as a experiment. In the manufacturings, the same sputtering apparatus is employed so as to form on the magnetic layer 1 a non-magnetic film made of Al as the intermediate layer $5b$.

The respective samples $A_5$ to $D_5$ are distinguished over the earlier mentioned $A_1$ to $D_1$ in that they have respective intermediate layers $5b$. After the respective samples $A_5$ to $D_5$ were placed into the magneto-optical disk apparatus like the foregoing embodiment, recording and reproduction operations were carried out. As a result, good overwriting characteristics and good reproducing characteristics were obtaied except for the case of the samples $A_5$.

Note that no force due to the exchange coupling interaction between the magnetic layers 2 and 3 is exerted. So, the optimum magnetic fields $H_{EX}$ of the samples $B_5$, $C_5$, and $D_5$ were 32 kA/m, 25 kA/m, and 40 kA/m respectively unlike the foregoing embodiment.

Note that in the case of the sample $A_5$ it was not possible to carry out the optically modulated overwriting since only one directional force is exerted on the magnetization $M_2$ of the magnetic layer 2.

The present embodiment employs Al as the material of the intermediate layer $5b$. However, AlN may be alternatively employed. Further, it may be possible that other targets than the five element targets are prepared and non-magnetic layer made of such a Ti, Cr, Ta, Mo, Si, SiO, AlSiO, or SiN is formed on the magnetic layer 1.

The following description deals with a sixth embodiment of the present invention with reference to FIG. 9. Note that, for convenience sake, the same reference numerals are given to members which have the same functions as those of the above-mentioned embodiment and the explanations thereof are omitted here.

A magneto-optical recording medium of the present embodiment, as shown in FIG. 9, is distinguished over the foregoing embodiment in that either an intermediate layer $4a$ of an in-plane magnetization film or an intermediate layer $4b$ of a non-magnetic film is provided between the magnetic layers 1 and 2 and is also distinguished over the foregoing embodiment in that either an intermediate layer $5a$ of an in-plane magnetization film or an intermediate layer $5b$ of a non-magnetic film is provided between the magnetic layers 2 and 3. The intermediate layers $4a$, $4b$, $5a$, and $5b$ have the same functions and effects like the above-mentioned embodiment. The intermediate layers are manufactured in like manner of the above-mentioned embodiment.

Good overwriting characteristics and good reproducing characteristics were obtaied from samples $A_6$ to $D_6$ of magneto-optical disks which have intermediate layers $4a$ and $5a$. The optimum magnetic fields $H_{EX}$ of the samples $A_6$, $B_{6l}$, $C_6$, and $D_6$ were 25 kA/m, 25 kA/m, 32 kA/m, and 32 kA/m respectively.

Good overwriting characteristics and good reproducing characteristics were obtaied from samples $A_7$ to $D_7$, except for the sample $B_7$, of magneto-optical disks which have intermediate layers $4b$ and $5a$. The optimum magnetic field $H_{EX}$ of the samples $A_7$, $C_7$, and $D_7$ were 28 kA/m, 36 kA/m, and 28 kA/m respectively.

Good overwriting characteristics and good reproducing characteristics were obtaied from samples $A_8$ to $D_8$, except for the sample $A_8$, of magneto-optical disks which have intermediate layers $4a$ and $5b$. The optimum magnetic fields $H_{EX}$ of the samples $B_8$, $C_8$, and $D_8$ were 28 kA/m, 28 kA/m, 36 kA/m respectively.

Good overwriting characteristics and good reproducing characteristics were obtained from samples $A_9$ to $D_9$, except for the samples $A_9$ and $B_9$, of magneto-optical disks which have intermediate layers $4b$ and $5b$. The optimum respective magnetic fields $H_{EX}$ of the samples $C_9$, and $D_9$ were 32 kA/m.

As mentioned above, the magneto-optical recording medium of the first embodiment in accordance with the present invention is arranged such that the magnetic layers 1 to 3 are luminated in this order on the substrate 6. The magnetic layer 1 employs the material which is the in-plane magnetization film at temperature $T_{ROOM}$ and also is changed into he vertical magnetization film in response to the temperature rise. The magnetic layer 2 is made of the vertical magnetization film, and the magnetic layer 3 is made of the vertical magnetization film which has a higher Curie temperature ($T_{C3}$) than that of the magnetic layer 2. Accordingly, when (1) the constant $H_{EX}$ is applied, (2) the magnetization direction of the magnetic layer 3 is completed so as to direct a specific one direction, and (3) a light beam which is modulated so as to have the low power or the high power in response to the recording information is projected from the substrate 6 side, it is possible to carry out the optically modulated overwriting with respect to the magnetic layer 2. The magnetic layer 3 has a higher Curie temperature than that of the magnetic layer 2. Accordingly, the temperature of the magnetic layer 3 does not rise to a temperature of not less than $T_{C3}$ provided that the optically modulated overwriting is carried out in the vicinity of the Curie temperature $T_{C2}$ of the magnetic layer 2. Therefore, once the magnetization of the magnetic layer 3 is directed to the specific one direction, the direction of the magnetization does not change during the optically modulated overwriting. So, it is not necessary to prepare an initialization magnetic field generating mechanism for directing the magnetization of the magnetic layer 3 to one direction for each optically modulated overwriting.

In contrast, by projecting a light beam having weaker intensity than that of the optically modulated overwriting, the recorded information of the magnetic layer 2 can be reproduced magneto-optically through the portion which is changed into the vertical magnetization. The portion, which is changed into the vertical magnetization film, varies depending on the light beam intensity. Accordingly, when the light beam intensity if adjusted, it is possible to make the extension of the portion smaller than the light beam spot, thereby enabling to reproduce the information recorded in a portion which is smaller than the light beam spot.

Each of the second to sixth magneto-optical recording mediums is arranged such that the magnetic layers 1 to 3 are luminated in this order on the substrate 6. Each magnetic layer 1 employs the magnetic material which is the in-plane magnetization film at room temperatures and also is changed into the vertical magnetization film in response to the temperature rise. Each magnetic layer 2 is made of the vertical magnetization film, and each magnetic layer 3 is made of the vertical magnetization film which has the higher Curie temperature ($T_{C3}$) than that of the magnetic layer 2. Either (1) the intermediate layer 4a or 5a or (2) the intermediate layer 4b or 5 b is provided at least one of between the magnetic layers 1 and 2 and between the magnetic layers 2 and 3. The intermediate layers 4a and 5a are made of the in-plane magnetization films, and the intermediate layers 4b and 5 b are made of the non-magnetic films. Accordingly, the force due to the exchange coupling interaction between the magnetic layers 1 and 2 or the force due to the exchange coupling interaction between the magnetic layers 2 and 3 can be easily controlled by the intermediate layer 4a or 5a in addition to the above-mentioned fuctions. Therefore, (1) the film designs of the magnetic layers 1 and 2 or (2) the film designs of the magnetic layers 2 and 3 is easily carried out. Further, it is possible that no force due to the exchange coupling interaction between the magnetic layers 1 and 2 or no force due to the exchange coupling interaction between the magnetic layers 2 and 3 can be exerted by the intermediate layer 4b or 5b.

The respective embodiments deal with the case where the magneto-optical disk is employed as the magneto-optical recording medium. However, the present invention may be adapted for a magneto-optical card and a magneto-optical tape. Note that in the case of the magneto-optical tape a tape base made of polyethylene terephthalate or other material may be substituted for the substrate.

There are described above novel features which the skilled man will appreciate give rise to advantages. These are each independent aspects of the invention to be covered by the present application, irrespective of whether or not they are included within the scope of the following claims. T,420

What is claimed is:

1. A magneto-optical recording medium comprising:
   a first magnetic layer for reading out information, said first magnetic layer being made of a magnetic material which is an in-plane magnetization film at room temperature, and is changed into a vertical magnetization film in response to a temperature rise;
   a second magnetic layer for recording of information, said second magnetic layer being made of a vertical magnetization film;
   a third magnetic layer for assisting in recording of information, said third magnetic layer being made of a vertical magnetic film having a higher Curie temperature than that of said second magnetic layer, the coercive force of said third magnetic layer being greater than an external magnetic field and also being greater than the strength of the exchange coupling interaction between said third and said second magnetic layers, the strength of exchange coupling between said third and second magnetic layers at room temperature being smaller than the coercive force of said second magnetic layer at room temperature, and said third magnetic layer having a magnetization direction that is preliminarily completed so as to have one direction; and
   a base substrate on which said first, second, and third magnetic layers are laminated in that order, and wherein the Curie temperature of said first magnetic layer is set to a high temperature so as not to change the magnetization during recording of information, the Curie temperature of said second magnetic layer is set to a low temperature so as to record the information, and the Curie temperature of said third magnetic layer is set to a high temperature so as not to change the magnetization direction during recording of information.

2. The magneto-optical recording medium as set forth in claim 1, wherein said first magnetic layer is made of a ferrimagnetic material of a rare earth-transition metal alloy, sub-lattice magnetic moment of the rare earth is greater than that of the transition metal so as to be an in-plane magnetization film at the room temperature while the sub-lattice magnetic moment of the transition metal is balanced with that of the rare earth so as to be a vertical magnetization film in response to the temperature rise.

3. The magneto-optical recording medium as set forth in claim 1, wherein coercive force of said second magnetic layer at the room temperature is set to a high temperature such that the information recorded as the magnetization direction is stably kept.

4. The magneto-optical recording medium as set forth in claim 1, further comprising:
   a first transparent dielectric layer which is provided between said base substrate and said first magnetic layer;
   a second transparent dielectric layer which is provided on said third magnetic layer; and an overcoat layer which is provided on said second transparent dielectric layer.

5. The magneto-optical recording medium as set forth in claim 1, further comprising an intermediate layer made of an in-plane magnetization film which is provided between said first and second magnetic layers.

6. The magneto-optical recording medium as set forth in claim 5, wherein a Curie temperature of said intermediate layer is set to a temperature which is substantially the same as that of said second magnetic layer.

7. The magneto-optical recording medium as set forth in claim 1, further comprising an inytermediate layer made of a non-magnetic film which is provided between said first and second magnetic layers.

8. The magneto-optical recording medium as set forth in claim 1, further comprising an intermediate layer made of an in-plane magnetization film which is provided between said second and third magnetic layers.

9. The magneto-optical recording medium as set forth in claim 8, wherein a Curie temperature of said intermediate layer is set to a temperature which is substantially the same as that of said second magnetic layer.

10. The magneto-optical recording medium as set forth in claim 1, further comprising an intermediate layer made of a non-magnetic film which is provided between said second and third magnetic layers.

11. A method recording information on a magneto-optical recording medium, comprising:
providing a recording medium having a first magnetic layer for reading out information, said first magnetic layer being made of a magnetic material which is changed into a vertical magnetization film in response to a temperature rise, while being an in-plane magnetization film at a room temperature;
said medium further having a second magnetic layer for recording the information, said second magnetic layer being made of a vertical magnetization film;
said medium further having a third magnetic layer for assisting in recording of information, a magnetization direction of said third magnetic layer being preliminarily completed so as to have one direction, said third magnetic layer being made of a vertical magnetic film having a higher Curie temperature than that of said second magnetic layer, the coercive force of said third magnetic layer being greater than an external magnetic field and also being greater than the strength of exchange coupling interaction between said third and said second magnetic layers, the strength of exchange coupling between said third and second magnetic layers at room temperature being smaller than the coercive force of said second magnetic layer at room temperature;
and said medium further having, a base substrate on which said first, second, and third magnetic layers are laminated in that order,
matching a magnetization direction of said first magnetic layer with a direction of a recording magnetic field, which is reversely vertical to the magnetization direction of said third magnetic layer and which is smaller than a coercive force of said third magnetic layer by applying the constant recording magnetic field to the magneto-optical recording medium;
irradiating a light beam whose intensity has been modulated to a lower power and a high power from a base substrate in accordance with said information;
recording said information in said second magnetic layer such that the magnetization direction of said second magnetic layer is matched with that of said third magnetic layer after the temperature of said second magnetic layer has been raised to its Curie temperature by the light beam in the case where the low power is irradiated, whereas the magnetization direction of said second magnetic layer is matched with the magnetization direction of said first magnetic layer after the temperature of said second magnetic layer has been raised to its Curie temperature by the light beam in the case where the high power light beam is irradiated, and wherein the Curie temperature of said first magnetic layer is set to a high temperature so as not to change the magnetization during recording of information, the Curie temperature of said second magnetic layer is set to a low temperature so as to record the information, and the Curie temperature of said third magnetic layer is set to a high temperature so as not to change the magnetization direction during recording of information.

* * * * *